(12) United States Patent
Lubbers

(10) Patent No.: US 8,457,854 B2
(45) Date of Patent: Jun. 4, 2013

(54) METHOD AND DEVICE FOR LIMITING THE OUTPUT SIGNAL OF A SENSOR TO REDUCE NOISE

(75) Inventor: Mark D. Lubbers, Ann Arbor, MI (US)

(73) Assignee: Kelsey-Hayes Company, Livonia, MI (US)

( * ) Notice: Subject to any disclaimer, the term of this patent is extended or adjusted under 35 U.S.C. 154(b) by 761 days.

(21) Appl. No.: 12/516,821

(22) PCT Filed: Nov. 29, 2007

(86) PCT No.: PCT/US2007/024581
§ 371 (c)(1),
(2), (4) Date: Jan. 18, 2010

(87) PCT Pub. No.: WO2008/066892
PCT Pub. Date: Jun. 5, 2008

(65) Prior Publication Data
US 2010/0179740 A1    Jul. 15, 2010

Related U.S. Application Data

(60) Provisional application No. 60/861,946, filed on Nov. 30, 2006.

(51) Int. Cl.
*B60T 8/17* (2006.01)
*F16D 55/224* (2006.01)
*G06F 19/00* (2006.01)

(52) U.S. Cl.
USPC ............................ 701/70; 701/78; 303/191

(58) Field of Classification Search
USPC ............ 701/70, 78; 303/191, 116.1; 188/72.4
See application file for complete search history.

(56) References Cited

U.S. PATENT DOCUMENTS

| | | | | |
|---|---|---|---|---|
| 4,043,608 A | * | 8/1977 | Bourg et al. | 303/167 |
| 5,671,981 A | | 9/1997 | Sasaki et al. | |
| 6,196,643 B1 | * | 3/2001 | Yokoyama et al. | 303/166 |
| 7,823,986 B2 | * | 11/2010 | Ruffer et al. | 303/115.3 |
| 2002/0130550 A1 | * | 9/2002 | Roden et al. | 303/113.1 |
| 2009/0095100 A1 | * | 4/2009 | Toyohira et al. | 74/110 |
| 2009/0230762 A1 | * | 9/2009 | Giers et al. | 303/3 |

FOREIGN PATENT DOCUMENTS

| | | |
|---|---|---|
| JP | 08292112 A | 11/1996 |
| KR | 1020020029986 A | 4/2002 |

* cited by examiner

*Primary Examiner* — Tan Q Nguyen
(74) *Attorney, Agent, or Firm* — MacMillan, Sobanski & Todd, LLC

(57) ABSTRACT

An algorithm for limiting the output of a master cylinder pressure sensor in an electronic brake control system to a value that is a function of the master cylinder pressure and the travel of the brake pedal.

17 Claims, 7 Drawing Sheets

METHOD AND DEVICE FOR LIMITING THE
OUTPUT SIGNAL OF A SENSOR TO REDUCE
NOISE

CROSS-REFERENCE TO RELATED APPLICATIONS

Background of the Invention

This invention relates in general to electronic brake control systems and in particular to a method and device for reduction of sensor signal noise.

Currently, many vehicles are equipped with electronically controlled brake systems that include selectively controlled solenoid valves in the brake circuits to enhance control of the vehicle. Such systems include Anti-Lock Brake Systems (ABS), Traction Control Systems (TCS) and/or a Vehicle Stability Control Systems (VSC) and are typically actuated upon detection of a vehicle dynamic parameter exceeding a predetermined threshold. For example, an ABS is typically actuated upon detection of excessive wheel slip prior to the wheel locking up. Following actuation of the system, the solenoid valves are selectively operated to first isolate the affected vehicle wheel brakes from the vehicle master cylinder and then to control the hydraulic pressure applied to the wheel brakes to correct the problem.

Referring now to the drawings, there is illustrated in FIG. 1 a typical hydraulic brake system 10 that includes an electronic brake control capability. The system 10 is intended to be exemplary and it will be appreciated that there are other brake control system configurations that may be utilized to implement the present invention. The system 10 includes a brake pedal 12 that is mechanically connected to a brake light switch 13 and a master cylinder 14 having dual actuation chambers. A first actuation chamber of the master cylinder 14 supplies hydraulic fluid to a first wheel brake circuit 16 that includes the front right and rear left wheel brakes, 17 and 18, respectively, while the second actuation chamber provides hydraulic brake fluid to a second wheel brake circuit 20 that includes the front left and rear right wheel brakes, 21 and 22, respectively. Both master cylinder actuation chambers communicate with a master cylinder brake fluid reservoir 15.

Considering the first wheel brake circuit 16, the first actuation chamber of the master cylinder 14 supplies hydraulic fluid to the first brake circuit 16 through a first normally open isolation solenoid valve 24. When a TCS is provided, the first isolation valve 24 may also be referred to as a Traction Control (TC) isolation valve. Two channels are defined within the first brake circuit 16 by second and third normally open isolation solenoid valves 25 and 26, respectively, that control the supply of brake fluid to the front right and rear left wheel brakes, 17 and 18, respectively. Because the second and third isolation valves 25 and 26 are operative to block the supply of brake fluid to the individual wheel brakes 17 and 18 in the first brake circuit, they may also be referred to as channel isolation valves. The first circuit 16 also includes a pair of normally closed dump solenoid valves 27 and 28 that are connected between the front right and rear left wheel brakes, 17 and 18, respectively, and a low pressure accumulator 30 that stores brake fluid. Upon actuation, the dump valves 27 and 28 bleed hydraulic fluid from the associated wheel brakes 17 and 18 to the accumulator 30. The accumulator 30 also is connected to an inlet port of a hydraulic pump 32 that is driven by an electric motor (not shown). An outlet port of the pump 32 is connected to the channel isolation valves 25 and 26. Thus, when actuated, the pump 32 supplies pressurized brake fluid to the first circuit wheel brakes 17 and 18. A normally closed supply solenoid valve 34 is connected between the pump inlet port and the first actuation chamber of the master cylinder 14. The supply valve 34 may also be referred to as a TC supply valve. When both the supply valve 34 and the pump 32 are actuated, the pump draws brake fluid from the master cylinder reservoir 15 through the first actuation chamber of the master cylinder 14. When the pump 32 is not actuated and the supply valve 34 and either/or both of the dump valves 27 and 28 are opened, brake fluid will return from one or both of the wheel brakes 17 and 18 to the master cylinder 14. Any excess returned brake fluid will flow into the master cylinder reservoir 15.

The second brake circuit 20 includes similar components that are symmetrically related to the components described above for the first brake circuit 16, Therefore, for the sake of brevity, the components included in the second brake circuit 20 are not described in detail here. The brake system 10 further includes an Electronic Control Unit (ECU) 38 that is electrically connected to the solenoid valves. The electrical connections are shown by dashed lines in FIG. 1; however, in the interest of clarity, only connections to two of the solenoid valves, 24 and 25, are shown. It will be appreciated that similar connections are provided to the other solenoid valves.

The speed of the left and right front wheels are monitored by a first pair of wheel associated wheel speed sensors, 39 and 40, respectively. Similarly, the speed of the left and right rear wheels are monitored by a second pair of associated wheel speed sensors 41 and 42, respectively. Alternately, with a rear wheel drive vehicle, a single wheel speed sensor (not shown) may be used to monitor the rear wheel speed. Typically, the single rear wheel speed sensor would be mounted upon the vehicle differential and would produce a signal that is proportional to the average of the individual rear wheel speeds. The wheel speed sensors 39, 40, 41 and 42 are electrically connected to the Electronic Control Unit (ECU) 38.

The ECU 38 is also electrically connected to the brake light switch 13. Closing the brake light switch 13 provides a signal to the ECU 38 that the vehicle brakes have been activated. The ECU 38 also is electrically connected to the pump motor and includes a microprocessor 44 with a memory that stores a brake control algorithm. As also shown in FIG. 1, the brake control system 10 also includes a pressure sensor 46 monitoring the brake fluid pressure in both master cylinder actuation chambers. The pressure sensor 46 is electrically connected to the ECU 38. The microprocessor 44 in the ECU 38 is responsive to changes in the master cylinder pressure and the brake pressure algorithms to increase or decrease the hydraulic pressure applied to the individual wheel brakes. The pressure sensor 46 also provides the microprocessor 44 with an initial starting point for pressure estimation while providing information regarding actions of the vehicle operator. With respect to the latter function, when the operator applies the brakes while the system 10 is active, the pressure sensor signal may cause the ECU microprocessor 44 to pulse open the supply valve 34, allowing a pressure increase. Similarly, if the operator releases the brakes, the pressure sensor 46 detects the pressure drop and the ECU 38 may pulse open the dump valves to decrease the wheel brake pressure. The brake control system 10 may also include a second pressure sensor (not shown) for monitoring the hydraulic fluid pressure in the second master cylinder actuation chamber.

During vehicle operation, the microprocessor 44 in the ECU 38 continuously receives signals from the wheel speed sensors 39, 40, 41 and 42 and the pressure sensor 46. The ECU 38 is operative, based upon sensor input and under control of the microprocessor 44 and the stored brake control algorithm, to select a mode of operation. The ECU 38 is further operative, again under control of the microprocessor 44 and the brake control algorithm, to selectively activate the pump motor and solenoid valves to correct potential problems in the vehicle dynamics. For example, during a brake application, the microprocessor 44 in the ECU 38 calculates a theoretical speed ramp that represents the speed the vehicle would travel if decelerated at a predetermined maximum rate, such as, for example, 1.0 g. The microprocessor 44 continues to monitor the speed of the wheel relative to both the actual wheel speed and theoretical speed ramp. When the microprocessor 44 detects that the wheel deceleration has reached a predetermined threshold value, such as 1.3 g, the microprocessor 44 enters an ABS mode of operation and causes the isolation valve associated with the wheel brake to close, limiting the pressure applied to the wheel cylinder of a constant level.

When the difference between the actual wheel speed and the calculated speed ramp exceeds a predetermined slip threshold $S_t$, it is an indication that a predetermined slippage is occurring between the actual wheel speed and the vehicle speed and that the wheel has potential to lock-up. At this point, it is desirable to selectively reduce the pressure of the hydraulic fluid being applied to the wheel cylinder and the ECU microprocessor 44 applies a series of pulses to the dump valve associated with the wheel cylinder to lower pressure sufficiently to cause the wheel to spin back up to the vehicle speed.

After the wheel speed attains the vehicle speed, the ECU microprocessor 44 applies a series of pulses to the apply valve associated with the wheel cylinder to raise the pressure. These pulses precipitate a second wheel speed departure. Upon correction of the second wheel speed departure with a second series of dump pulses, the currently applied pressure, while lower than the initial pressure, is greater than the pressure present after correction of the first wheel speed departure. Thus, the electronic brake control system 10 provides control over the individual wheel speeds by switching between hold, dump and apply modes of operation of the solenoid valves included in the control valve 16.

Because the speed of each wheel is monitored separately, the ECU microprocessor 44 may also cause the electronic brake control system 10 to function in a Traction Control System (TCS) mode and/or a Vehicle Stability Control System (VCS) mode upon detecting triggering levels in the monitored vehicle parameters. As described above, during operation in the TCS and/or VCS modes, the applied wheel brake pressure may exceed the pressure in the master cylinder 14. Accordingly, the channel isolation valves are usually closed during operation in these modes. Furthermore, if additional brake fluid is needed, the supply valves are opened to allow the pump 32 to draw fluid from the master cylinder reservoir 15. Also, a brake proportioning function may be provided by the electronic brake control system 10 during a vehicle stop. The brake control system 10 actuates the rear brake isolation valve and then selectively actuates the rear dump and apply valves to provide a brake pressure to the rear brake circuit that is lower than the brake pressure provided to the front brake circuit.

As indicated above, one of the parameters utilized by the brake control algorithm in the ECU 38 is the brake fluid pressure, as determined by the pressure sensor 46. However, due to the conditions under which the ECU 38 operates, noise spikes, due to undesired electrical or mechanical interference, may appear on the pressure sensor signal and be severe enough to contaminate the signal. Such a contaminated signal may decrease the operating efficiency of the electronic brake control system 10. Accordingly, it would be desirable to reduce disturbances upon the master cylinder pressure signal before the signal is utilized by the brake control algorithm.

BRIEF SUMMARY OF THE INVENTION

This invention relates to a method and device for reduction of sensor signal noise in electronic brake control systems.

The invention contemplates a system for generating a brake control signal limit for a vehicle brake system that includes a pressure sensor adapted to be mounted upon a brake master cylinder with the pressure sensor operative to generate an output signal that is proportional to the pressure exerted upon brake fluid by the master cylinder. The system also includes a brake pedal travel sensor adapted to be mounted upon a vehicle brake pedal with the brake pedal travel sensor operative to generate an output signal that is a function of brake pedal travel. The system further includes an electronic device connected to the pressure and brake pedal travel sensors that is operative to generate a brake control signal limit that is a function of the output signals generated by the brake pressure and brake pedal travel sensors.

The invention also contemplates that the electronic device generates the brake control signal limit as a function of the time derivative of a distance traveled by the vehicle brake pedal. The invention further contemplates that the electronic device is also operative to generate a brake control signal that is equal to the brake control signal limit when the master cylinder pressure is greater than or equal to the brake control signal limit and equal to the master cylinder pressure when the master cylinder pressure is less than the brake control signal limit.

The invention further contemplates a method for generating a brake control signal limit that includes the step of providing an electronic device connected to a master cylinder pressure sensor and a brake pedal travel sensor. The electronic device is operative to monitor the output of both the master cylinder pressure sensor and the output of the brake pedal travel sensor. The electronic device is further operative to generate a brake control signal limit that is a function of the outputs of the master cylinder pressure sensor and the brake pedal travel sensor.

As with the system described above, the invention further contemplates that the electronic device generates the brake control signal limit as a function of the time derivative of the brake pedal travel sensor output signal. Additionally, the method generates a brake control signal that is equal to the brake control signal limit when the master cylinder pressure is greater than or equal to the brake control signal limit and equal to the master cylinder pressure when the master cylinder pressure is less than the brake control signal limit Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
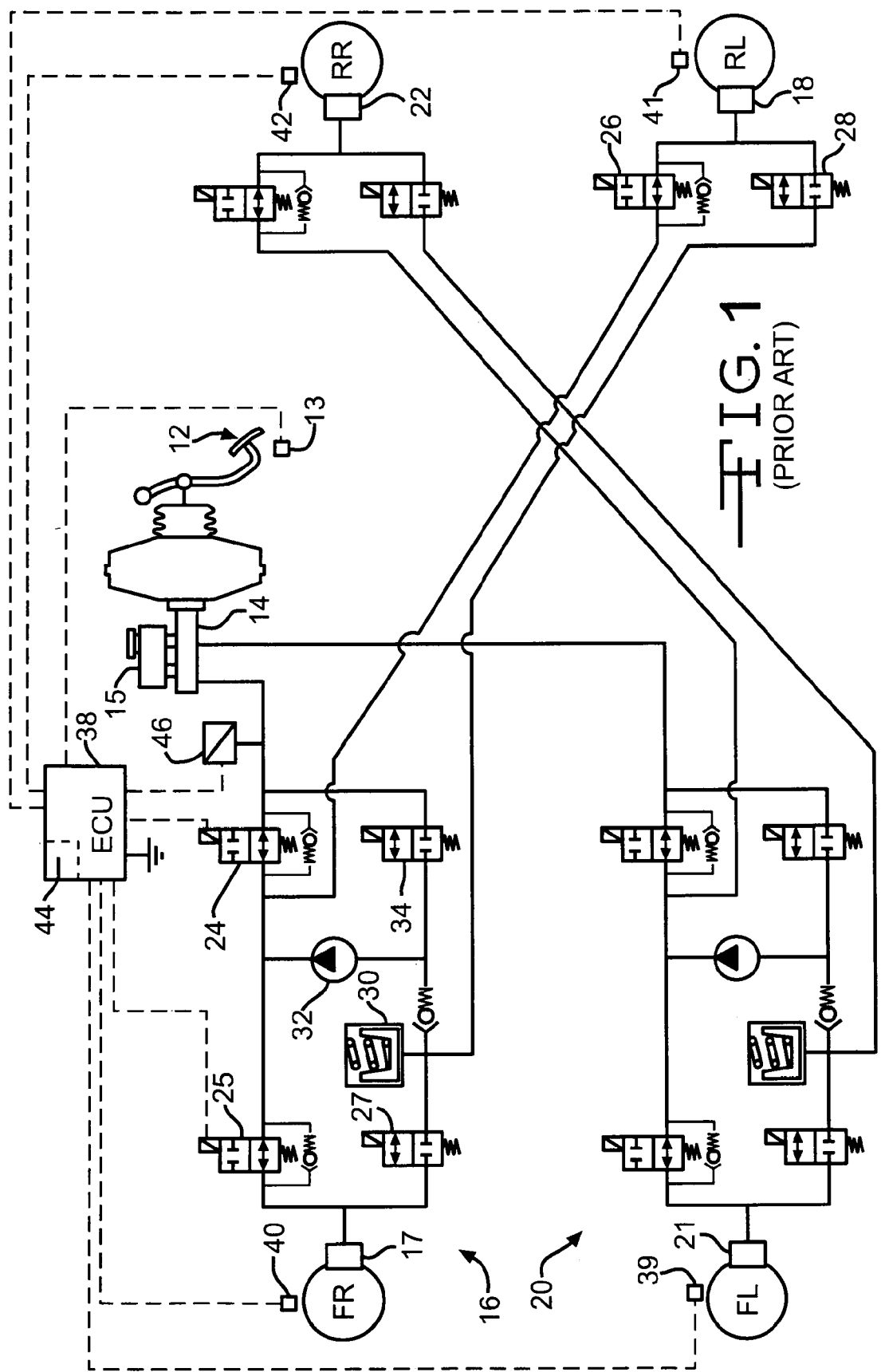
FIG. 1 is a schematic diagram of a typical electronic brake control system.
Figure 2:
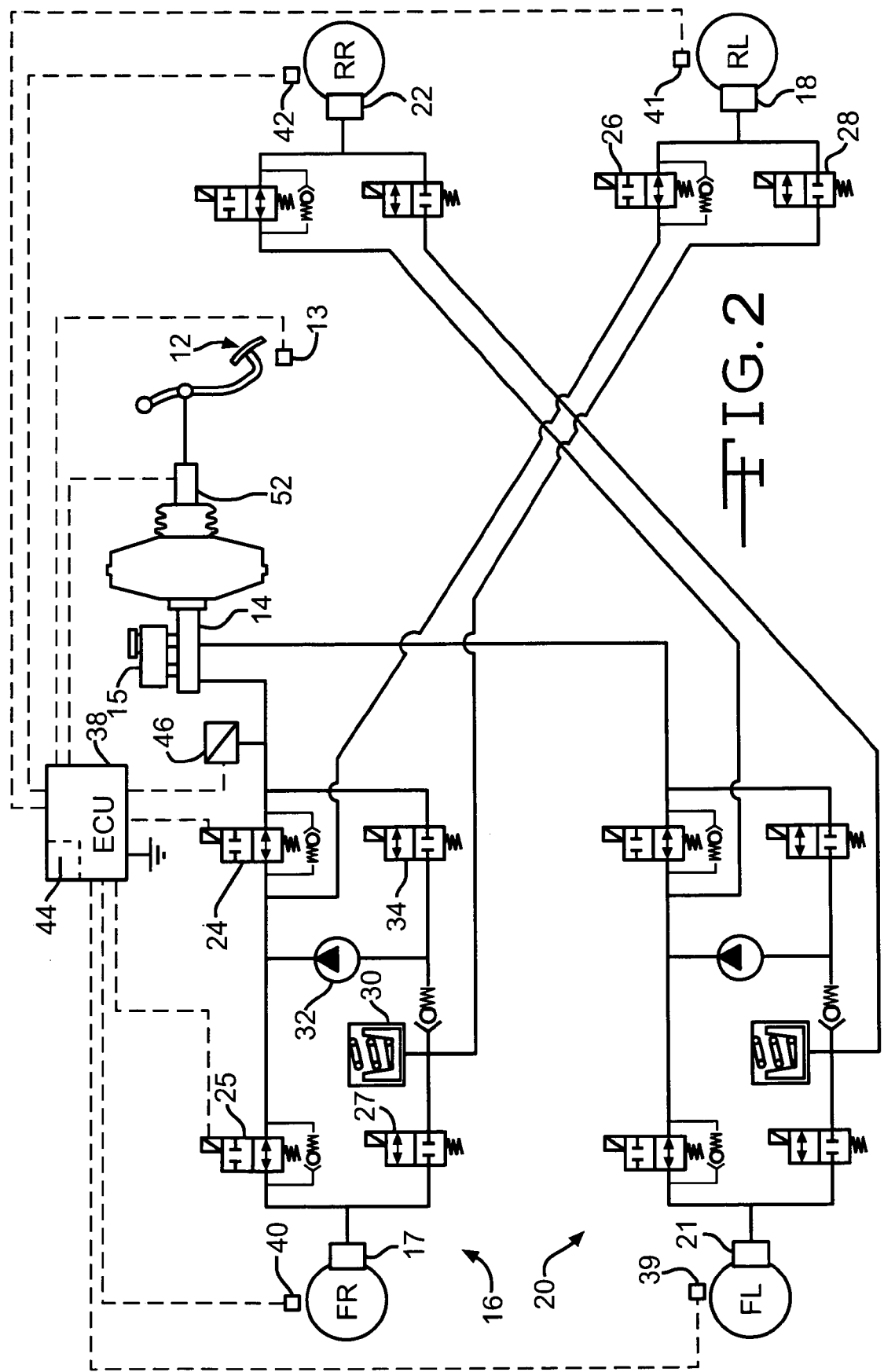
FIG. 2 is a schematic diagram of an electronic brake control system that is utilized with the present invention.

Referring now to the drawings, there is illustrated in FIG. 2, a schematic diagram of an electronic brake system 50 that includes the present invention. Components shown in FIG. 2 that are similar to components shown in FIG. 1 have the same numerical designators. As shown in FIG. 2 the brake system 50 includes a brake pedal travel sensor 52 that generates a signal that is proportional to the distance traveled by the brake pedal 12 when the pedal is depressed by the vehicle operator. The pedal travel sensor 52 is electrically connected to the microprocessor 44 in the ECU 38, as illustrated by the dashed line in FIG. 2.

Figure 3:
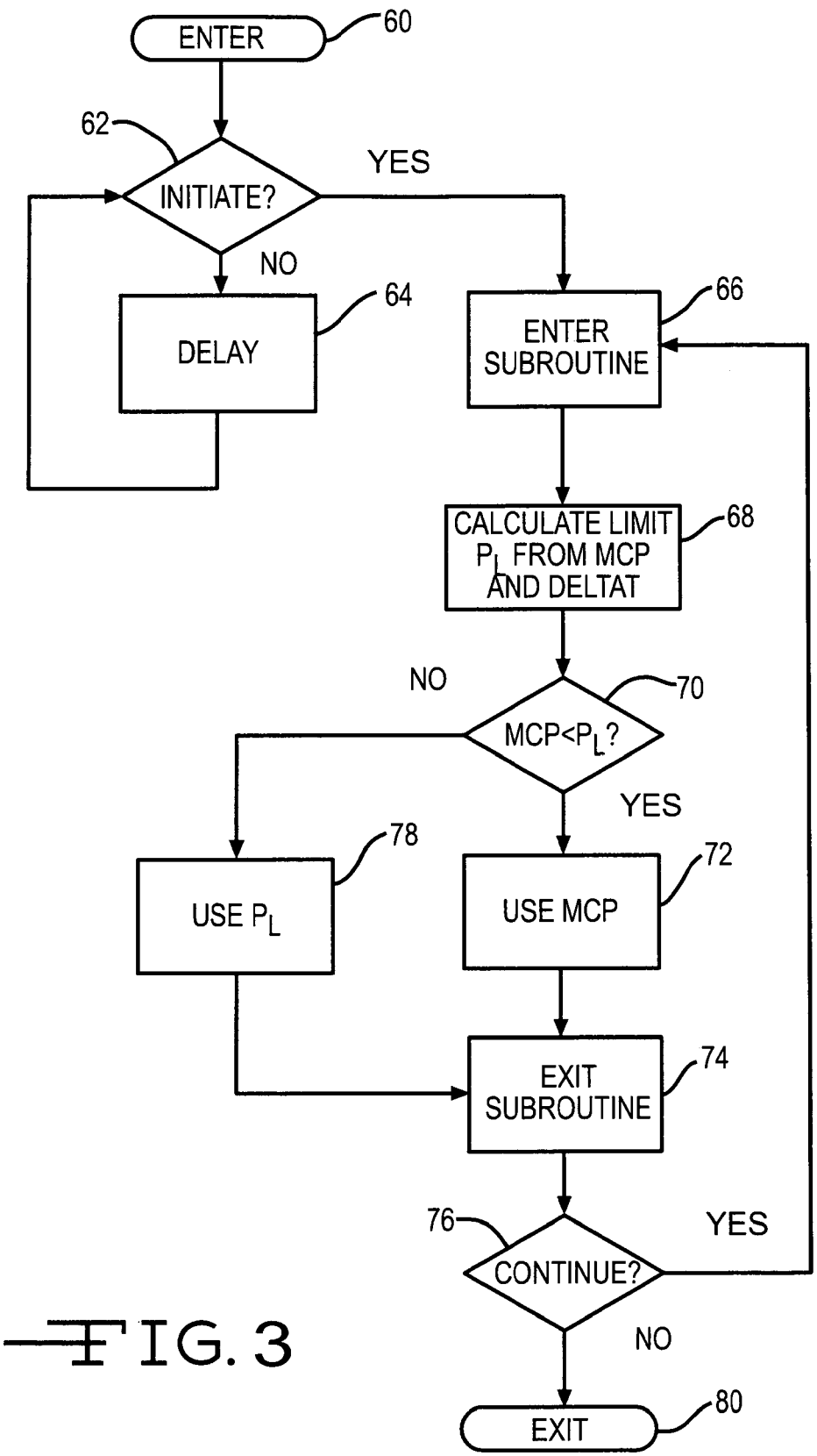
FIG. 3 is a flow chart for a method in accordance with the present invention for reducing noise in a sensor signal.

A flow chart for an algorithm for reducing disturbances upon the master cylinder pressure signal before the signal is utilized to by the brake control algorithm that is in accordance with the invention is shown in FIG. 3. The algorithm would be included in the algorithm utilized by the microprocessor 44 to control the electronic brake system 50. The algorithm would be either stored in the microprocessor 44 or in a microprocessor separate memory device (not shown). The invention contemplates that the algorithm illustrated in FIG. 3 would function as a subroutine within the overall electronic brake system control algorithm.

Generally, the algorithm illustrated in FIG. 3 provides a rate limit for the output signal from the master cylinder pressure sensor 46 as a function of the master cylinder pressure and the time derivative of the brake pedal travel as determined from the output of the brake pedal travel sensor 53. As the brake pedal travel derivative increases, the magnitude of the rate limit of the pressure sensor signal is allowed to increase. Similarly, the rate limit of the pressure sensor signal also is allowed to increase with an increase in the master cylinder pressure.

The algorithm is entered through block 60 and advances to decision block 62. In decision block 62 it is determined whether or not the actual algorithm calculation of master cylinder pressure is to be initiated. Any number of criteria may be utilized in decision block 62, such as, for example, checking to determine whether the stop light 13 has been closed at the start of a braking cycle or if the vehicle engine is running. If it is determined that the algorithm calculation is not to be initiated, the algorithm transfers to functional block 64 where a time delay is affected. The algorithm then returns to decision block 62 and again checks the initiation criteria.

If, in decision block 62, it is determined that the calculation is be initiated, the algorithm transfers to enter a subroutine that begins with functional block 66. The subroutine is explained below and illustrated by a flow chart shown in FIGS. 4A and 4B. Within the subroutine, a limit $P_L$ is calculated in functional block 68 for the output signal from master cylinder pressure sensor 52 that is a function of the master cylinder pressure and the time derivative of the brake pedal travel. The subroutine then continues to decision block 70 where the master cylinder pressure signal is compared to the limit $P_L$ calculated in functional block 68. If the master cylinder pressure is less than the limit $P_L$, the subroutine transfers to functional block 74 and the master cylinder pressure is selected for use by the electronic brake system 50. The subroutine is then exited through functional block 74 and advances to decision block 76. If, however, in decision block 70, it is determined that the master cylinder pressure signal is greater than or equal to the limit $P_L$ calculated in functional block 68, the subroutine transfers to functional block 78 and the current value of the limit $P_L$ is selected for use by the electronic brake system 50. The subroutine is then exited through functional block 74 and advances to decision block 76.

In decision block 76 it is determined whether or not the algorithm is to continue to be run. Again, any one of several criteria may be utilized, such as, for example, checking to determine whether the stop light switch 13 has remained closed or if the vehicle engine has continued to run. If it is determined that the algorithm is to continue to be run, the subroutine transfers to functional block 66 and reenters the subroutine to repeat the steps described above, If, in decision block 76, it is determined that the algorithm is not to continue to be run, the algorithm exits through block 80.

Figure 4A:
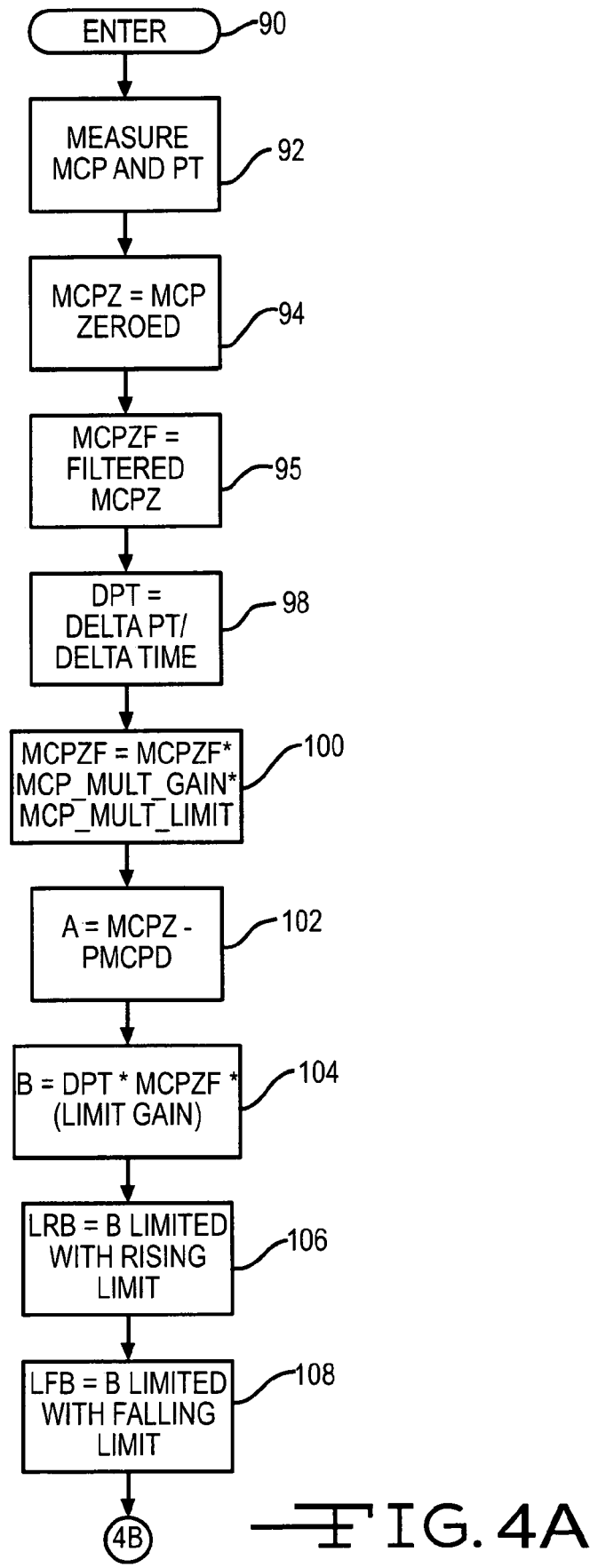
FIGS. 4A and 4B illustrate a flow chart for a subroutine for calculating a pressure limit in the flow chart shown in FIG. 3.
Figure 4B:
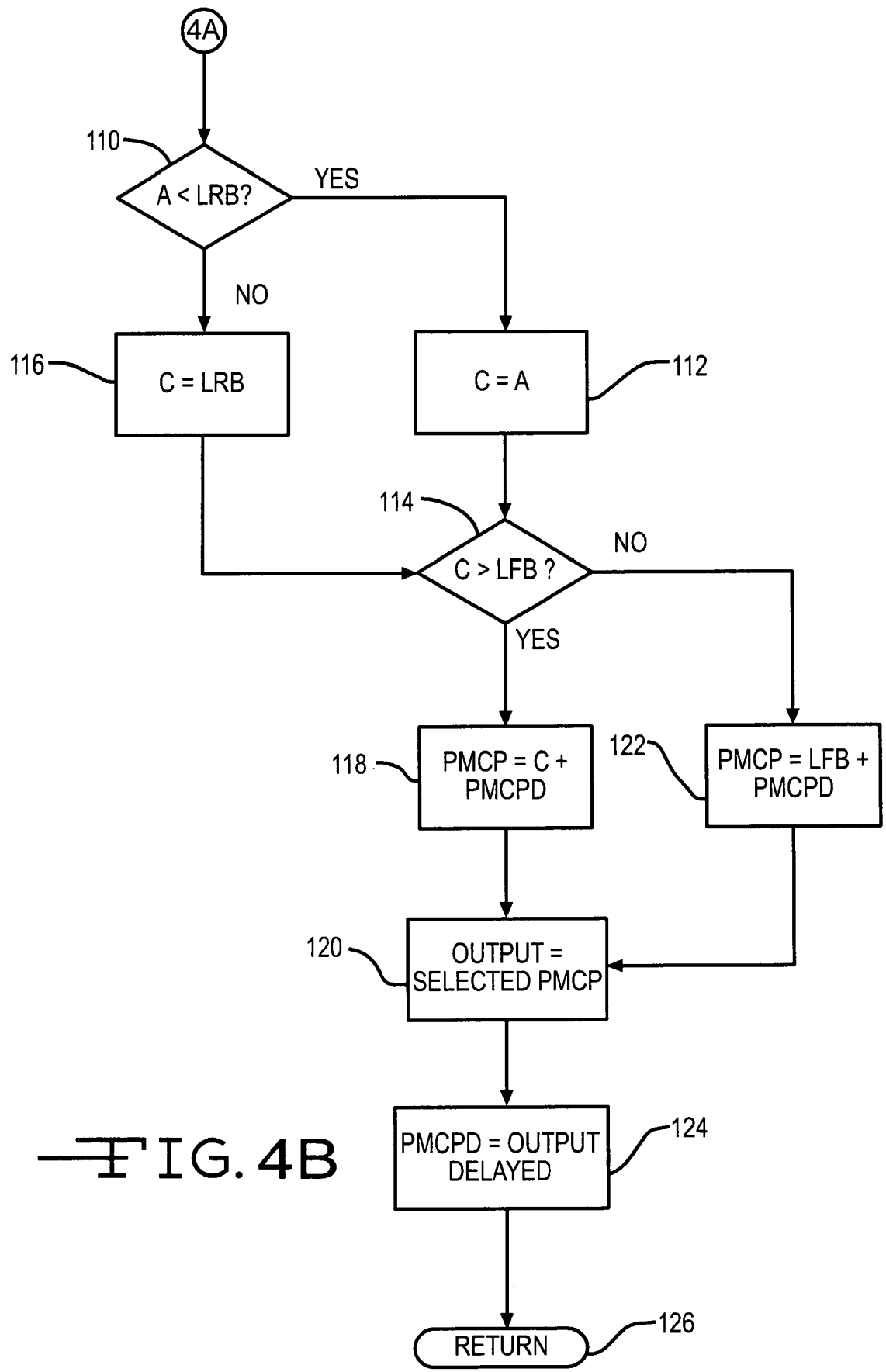

As indicated above, the details of the subroutine shown in functional block 38 of FIG. 3 are illustrated in FIGS. 4A and 4B. FIG. 4A illustrates the development of parameters that are utilized within the subroutine while FIG. 4B illustrates the actual calculation and implementation of the pressure limit. The subroutine is entered through block 90 and proceeds to functional block 92 where the Master Cylinder Pressure, MCP, and the Pedal Travel, PT, of the brake pedal are measured. The subroutine continues to functional block 94 where MCP is zeroed with a conventional zeroing subroutine to determine the change in the signal from a base value and thereby remove any bias; however, it will be appreciated that the invention also may be practiced with a non-zeroed MCP. The resulting zeroed MCP, MCPZ, is then filtered in functional block 96 to remove unwanted harmonics. In the preferred embodiment, a low pass filter having a cutoff frequency of 5 KHz is used in functional block 96; however, filters having other cutoff frequencies also may be used. The filtered zeroed MCP is identified in the flow chart as MCPZF. The subroutine then continues to functional block 98.

Because the pressure limit is a function of the rate of change of the brake pedal travel with respect to time, the derivative of the brake pedal travel, DELTA PT, is determined next in functional block 98 as being equal to:

DELTA PT=ΔPT/ΔT=(DELTA PT)/(DELTA TIME).

Because the subroutine is an iterative calculation, in the preferred embodiment, the time increment DELTA TIME is the reciprocal of the iteration rate which is, in turn, a function of the clock rate of the microprocessor 44. However, it will be appreciated that the invention also may be practiced using other time increments than the reciprocal of the iteration rate. The subroutine then advances to functional block 100.

In functional block 100 the filtered zeroed MCP, MCPZF, is further modified by multiplication by an adjustable constant gain, MCP_MULT_GAIN, and by passing through a first limiter, MCP_MULT_LIMIT, such that the value for MCPF is replaced by a new value determined by the following formula:

MCPZF=MCPZF*MCP_MULT_GAIN*MCP_MULT_LIMIT, where the constant gain is 0.5 and the limits of the first limiter define a range from a lower threshold of 0.5 to an upper threshold of 6.0. While a constant gain of 0.5 and a first limiter thresholds of 0.5 to 6.0 are given above, it will be appreciated that the invention also may be practiced with other values for the constant gain and the thresholds of the first limiter. Indeed, the invention contemplates adjusting the gain and varying the limiter thresholds as a means of trimming the subroutine for a particular application. The subroutine then continues by calculating first and second variables that are identified as A and B, respectively.

The first variable A is calculated in functional block 102 as the difference between MCPZ and a delayed value of the final pressure output signal PMCPD. The difference being given by the following formula:

$$A = MCPZ - PMCPD$$

Because there is no output, or processed, pressure, PMCP, for the first iteration of the subroutine, the value of A for the first iteration is simply MCPZ. The second variable B is calculated in functional block 104 as the product of the current filtered pressure MCPZF as determined in functional block 100 and the time derivative of the brake pedal travel DELTA PT multiplied by an adjustable constant, LIMIT GAIN, as shown in the following formula:

$$B = MCPZF * (DELTA\ PT) * (LIMIT\ GAIN)$$

Where the invention contemplates that LIMIT GAIN has a value of 0.003; however, other values may be used for LIMIT GAIN to trim the subroutine for a particular application.

The second variable, B, is supplied as input to a rising limiter in functional block 106 and to a falling limiter in functional block 108. Thus, in functional block 106, a rising limited value, BLR, is determined for the value of B, while in functional block 108, a falling limited value, BLF, is determined for the value of B. The invention contemplates that the rising limiter has upper and lower threshold values of 4.0 and 0.05, respectively, while the falling limiter has upper and lower threshold values of 0.4 and 0.05, respectively. However, the rising and falling limiter thresholds may be varied from the above values as a means of trimming the subroutine for a particular application.

The subroutine then continues to the pressure limit calculation and implementation portion, as shown by the flowchart in FIG. 4B. The subroutine enters decision block 110 where the variable A, which is the difference between the zeroed master cylinder pressure, MCPZ, and the delayed processed master cylinder pressure, PMCPD, as calculated in functional block 102, is compared to the current value of the limited rising variable, LRB, as determined in functional block 106. If A is less than LRB, a third variable, C is set equal to A in functional block 112 and the subroutine continues to decision block 114. If, however, in decision block 110, A is greater than or equal to LRB, the subroutine transfers to functional block 116 where the third variable C is limited to the current value of LRB, and the subroutine continues to decision block 114. In both functional blocks 112 and 116, the selected pressure is multiplied by a first predetermined trimming gain (not shown). While the invention contemplates utilizing 0.5 as the first predetermined trimming gain, other gains that are greater than, or less than, 0.5 also may be utilized.

In decision block 114, the third variable C is compared to the current value of the limited falling variable, LFB, as determined in functional block 108. If C is greater than LFB, the subroutine transfers to functional block 118 where a limited value equal to the sum of the variable C and the delayed processed master cylinder pressure, PMCPD, is selected as the processed master cylinder pressure, PMCP, that is the output of the subroutine. Thus, functional block 118 yields a limited pressure sensor output value. The subroutine then continues to functional block 120. If, however, in decision block 114, C is less than or equal to LFB, the subroutine transfers to functional block 122 where the sum of LFB and the delayed processed master cylinder pressure, PMCPD, is selected as the processed master cylinder pressure, PMCP. It is to be noted that, at this point, the value PMCPD has been subtracted from MCPZ in functional block 102 and then added to MCPZ in functional block 122 to produce an output equal to the zeroed master cylinder pressure MCPZ. The subroutine then continues to functional block 120. In both functional blocks 118 and 122, the selected pressure is again multiplied by a second predetermined trimming gain (not shown). While the invention contemplates utilizing 0.5 as the second predetermined trimming gain, other gains that are greater than, or less than, 0.5 also may be utilized.

In functional block 120, the selected value from functional block 118 or 122 is output as the Processed Master Cylinder Pressure, PMCP. The subroutine then advances to functional block 124 where the current value of PMCP is written into the memory storage for use as the Delayed Processed Master Cylinder Pressure, DPMCP, for use during the next iteration of the subroutine, which introduces the desired one iteration delay for the calculation. The subroutine then exits through block 126 to main algorithm shown in FIG. 3.

It is to be understood that the flow charts shown in FIGS. 3, 4A and 4B are intended to be exemplary of the algorithms of the invention and it will be appreciated that the invention also may be practiced with flowcharts that differ from the ones described above.

Figure 5:
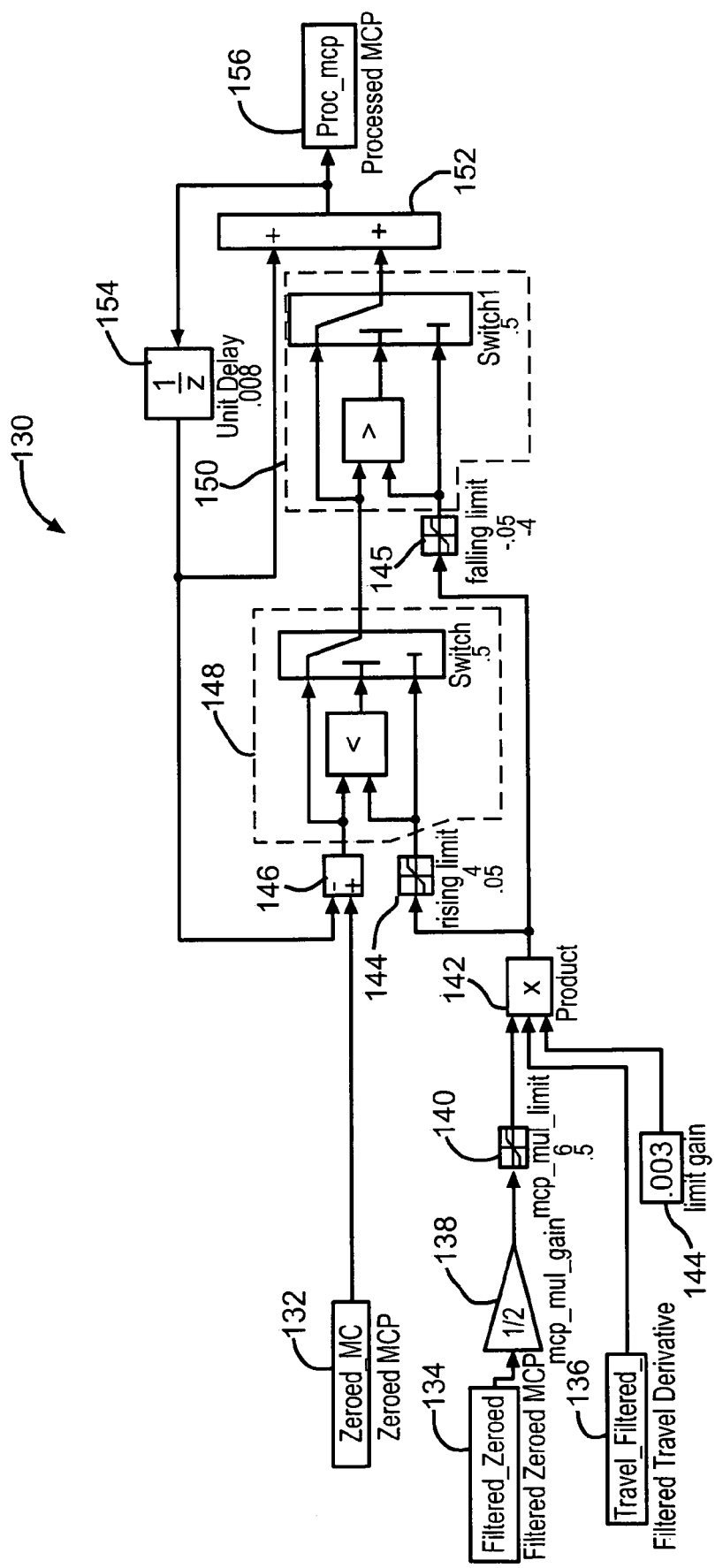
FIG. 5 is a schematic diagram illustrating a simulation of the subroutine shown in FIGS. 4A and 4B.

The present invention also is illustrated by a Simulink model, shown generally at 130 in the block diagram of FIG. 5, for converting the subroutine flowcharts shown in FIGS. 4A and 4B into coding for the algorithm that is utilized in the electronic brake system 50. The Simulink model 130 receives a zeroed value of the master cylinder pressure sensor output in block 132 which corresponds to functional block 94 in FIG. 4A. The Simulink model 130 also receives a filtered zeroed value of the master cylinder pressure in block 132 and a derivative of the brake pedal travel in block 134, which correspond to functional blocks 96 and 98 in FIG. 4A.

The filtered zeroed master cylinder pressure is multiplied by a preset gain and limited in blocks 138 and 140. The resulting product is then multiplied by the derivative of the brake pedal travel and a preset limit gain in block 142. The preset limit gain is set in block 144. These multiple operations are included in functional blocks 100 and 104 in FIG. 4A. The resulting product passes through both a rising limiter 144, and a falling limiter 145, which correspond to functional blocks 106 and 108, respectively, in FIG. 4A. As also shown in FIG. 5, the zeroed master cylinder pressure is supplied to a first summing block 146 where the previous output pressure of the circuit is subtracted from the zeroed pressure. The first summing block 146 corresponds to functional block 102 in FIG. 4A.

The output of the first summing block 146 provides a first input to a first switch 148 while the output of the rising limiter provides a second input to the first switch 148. The first switch is equivalent to decision block 110 in FIG. 4B. If the output of the first summing block 146 is less than the output of the rising limiter 144, the first switch 148 passes the output of the first summing block 146 to a first input of a second switch 150. Otherwise, the first switch 148 passes the output of the rising limiter 144 to the first input of the second switch 150.

The second switch 150 is equivalent to decision block 114 in FIG. 4B. As shown in FIG. 5, the second input of the second switch 150 is connected to the output of the falling limiter 145. If the output of the first switch 148 is greater than the output of the falling limiter 145, the output of the first switch is selected as the output of the second switch 150. Otherwise, the output of the falling limiter 145 is selected as the output of the second switch 150. The output of the second switch 150 is added to the previous output pressure of the circuit at a second summing block 152 that corresponds to functional blocks 118 and 122 in FIG. 4B. The resulting sum is fed back into the circuit through the unit delay 154 and output as the processed master cylinder pressure through interface block 156. The unit delay and interface blocks 154 and 156 correspond to functional blocks 124 and 120, respectively, in FIG. 4B

It will be appreciated that while a block diagram is shown in FIG. 5, the invention contemplates that conventional methods would be utilized to convert the specific functions shown for the individual Simulink blocks into coding, such as, for example C or C++, for use by the microprocessor 44.

Figure 6:
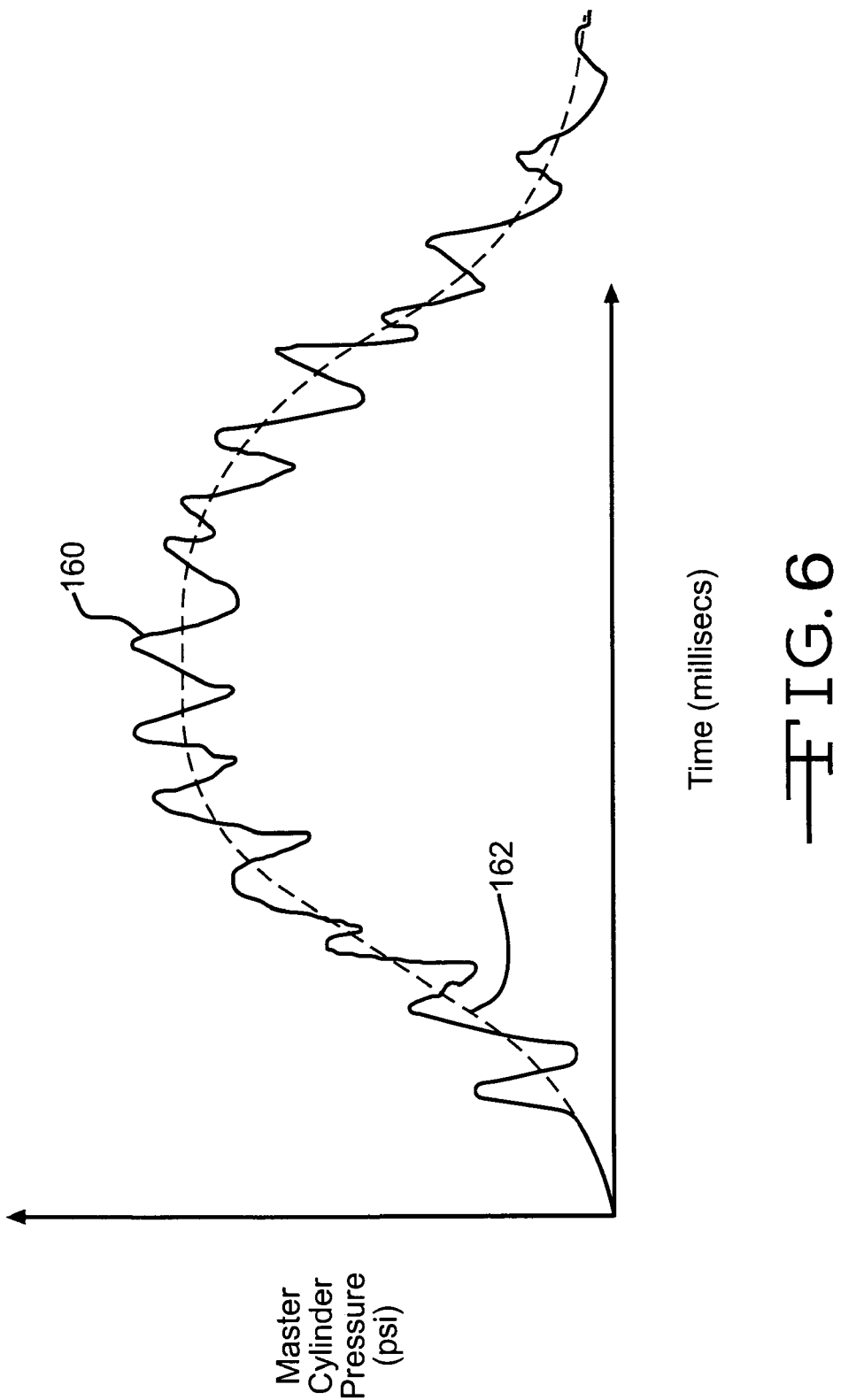
FIG. 6 is a graph of the master cylinder pressure sensor output signal as a function of time that illustrates the effect of the method illustrated in FIG. 3.

The results of utilization of the invention in the electronic brake system 50 are illustrated by the graph shown in FIG. 6 where brake pressure magnitude is plotted as a function of time. The solid line labeled 160 in FIG. 6 represents a typical brake pressure sensor signal generated during a brake application by a system that does not include the invention and thus includes extraneous system noise. The dashed line labeled 162 represents the brake pressure signal produced by a system that includes the present invention during the same brake cycle that produced the line labeled 160. The improvement due to elimination of extraneous spikes and noise is apparent. In conclusion, the present invention provides a simple and effective means to improve brake system performance by reducing noise that may be present on a brake activation signals.

While the present invention contemplates that the algorithm described above reduces disturbances to the master cylinder pressure signal that is used in electronic braking systems and Slip Control Boost (SCB) systems, it is appreciated that the invention also may be practiced to remove disturbances from signals in other electronic control systems. Examples of such control systems may include Engine Management Systems (EMS), Adaptive Cruise Control (ACC) Systems and Active Suspension Systems, to name a few. The invention further contemplates that final signal may be the function of two signals that are functions of the same vehicle operating parameter, such as the brake pressure and rate of change of brake pressure described above. Alternately, the final signal may be the function of two signals that are functions of different vehicle operating parameters.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. A system for generating a brake control signal limit for a vehicle brake system, the device comprising:
   a pressure sensor adapted to be mounted upon a brake master cylinder, said pressure sensor operative to generate an output signal that is proportional to the pressure exerted upon brake fluid by said master cylinder;
   a brake pedal travel sensor adapted to be mounted upon a vehicle brake pedal, said brake pedal travel sensor operative to generate an output signal that is a function of brake pedal travel; and
   an electronic device connected to said pressure and brake pedal travel sensors, said electronic device being operative to generate a brake control signal and a brake control signal limit, said brake control signal being a function of said output signals generated by only said brake pressure and brake pedal travel sensors with said brake control signal limited by said brake control signal limit.

2. The system according to claim 1 wherein said electronic device generates said brake control signal limit as a function of the time derivative of a distance traveled by said vehicle brake pedal.

3. The system according to claim 2 wherein said electronic device generates a brake control signal that is equal to said brake control signal limit when said master cylinder pressure is greater than or equal to said brake control signal limit.

4. The system according to claim 3 wherein said electronic device generates a brake control signal that is equal to said master cylinder pressure when said master cylinder pressure is less than said brake control signal limit.

5. The system according to claim 4 wherein the system is included in an electronic brake control system.

6. A method for generating a brake control signal limit for a vehicle brake system, the method comprising the steps of:
   (a) providing an electronic device connected to a master cylinder pressure sensor and a brake pedal travel sensor;
   (b) monitoring the outputs of both the master cylinder pressure sensor and the brake pedal travel sensor; and
   (c) generating a brake control signal and a brake control signal limit with the electronic device, the brake control signal being a function of the outputs of only the master cylinder pressure sensor and the brake pedal travel sensor with the brake control signal limited by the brake control signal limit.

7. The method according to claim 6 wherein the brake control signal limit generated by the electronic device in step (c) is a function of the time derivative of the brake pedal travel sensor output.

8. The method according to claim 7 wherein, during step (c), the electronic device generates a brake control signal that is equal to the brake control signal limit when the master cylinder pressure is greater than or equal to the brake control signal limit.

9. The method according to claim 8 wherein, during step (c), the electronic device generates a brake control signal that is equal to the master cylinder pressure when the master cylinder pressure is less than the brake control signal limit.

10. The method according to claim 9 wherein the method is applied to an electronic brake system.

11. A system for generating a control signal for a vehicle system, the device comprising:
    a sensor for measuring a vehicle operating parameter that is adapted to be mounted upon a vehicle, said sensor operative to generate a first signal that is a function of said vehicle operating parameter;
    a source of a second signal that is related to said vehicle operating parameter; and
    an electronic device connected to said sensor and said second signal source, said electronic device being operative to generate a control signal and a control signal limit, said control signal being a function of only said first and second signals with said brake control signal limited by said brake control signal limit.

12. The system according to claim 11 wherein said second signal is a function of the rate of change of said first signal.

13. The system according to claim 12 further including a differentiating device having an input port connected to said sensor to receive said first signal and an output port connected to said electronic device, said differentiating device being operative to generate said second signal at said output port as a function of the rate of change of said first signal.

14. The system according to claim 13 wherein said control signal is utilized to limit said vehicle operating parameter.

15. The system according to claim 11 wherein said sensor is a first sensor and said vehicle operating parameter is a first vehicle operating parameter and further wherein the system includes a second sensor for measuring a second vehicle operating parameter that is different from said first vehicle operating parameter, said second sensor being adapted to be mounted upon a vehicle, said second sensor operative to generate said second signal as a function of said second vehicle operating parameter.

16. The system according to claim 15 further including a differentiating device having an input port connected to said second sensor to receive said second signal and an output port connected to said electronic device, said differentiating device being operative to generate said second signal as a function of the rate of change of said second vehicle operating parameter.

17. The system according to claim 16 wherein said control signal is utilized to limit said vehicle operating parameter.

* * * * *